United States Patent
Dea et al.

(10) Patent No.: US 11,131,224 B1
(45) Date of Patent: Sep. 28, 2021

(54) EXHAUST SYSTEM HAVING PRESSURE SENSING SYSTEM WITH PLUGGING-MITIGATION CONDUIT FORMING ALWAYS-OPEN LEAKAGE PATH

(71) Applicant: Caterpillar Inc., Peoria, IL (US)

(72) Inventors: Kevin Lloyd Dea, Morton, IL (US); James Harris Mutti, Germantown Hills, IL (US); Thomas Reilly Fenelon, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/853,994

(22) Filed: Apr. 21, 2020

(51) Int. Cl.
*F01N 13/08* (2010.01)
*F01N 3/00* (2006.01)
*F01N 11/00* (2006.01)

(52) U.S. Cl.
CPC ............ *F01N 3/005* (2013.01); *F01N 13/08* (2013.01); *F01N 11/002* (2013.01); *F01N 2410/08* (2013.01); *F01N 2560/08* (2013.01); *F01N 2900/1406* (2013.01)

(58) Field of Classification Search
CPC .......... F01N 3/005; F01N 3/031; F01N 3/032; F01N 2560/08; F01N 2570/22
See application file for complete search history.

(56) References Cited

U.S. PATENT DOCUMENTS

| | | | |
|---|---|---|---|
| 7,406,822 B2 | 8/2008 | Funke et al. | |
| 8,910,476 B2 | 12/2014 | Nam et al. | |
| 8,968,443 B2 | 3/2015 | Brinkmeyer et al. | |
| 9,399,943 B1* | 7/2016 | Zhang | F01N 3/035 |
| 9,551,259 B1* | 1/2017 | Zhang | F01N 3/021 |
| 2014/0124060 A1* | 5/2014 | Brinkmeyer | G01L 23/24 |
| | | | 137/494 |
| 2017/0102311 A1* | 4/2017 | Zhang | F01N 3/021 |
| 2018/0320570 A1* | 11/2018 | Car | F01N 13/008 |

FOREIGN PATENT DOCUMENTS

| | | | |
|---|---|---|---|
| CN | 203614173 U | * | 5/2014 |
| DE | 102018204591 A1 | * | 10/2019 |
| JP | 01257711 A | | 10/1989 |
| JP | 6212419 B2 | | 10/2017 |
| KR | 20070025131 A | | 3/2007 |

* cited by examiner

*Primary Examiner* — Jonathan R Matthias
(74) *Attorney, Agent, or Firm* — Brannon Sowers & Cracraft

(57) ABSTRACT

An exhaust system includes an exhaust pressure sensing system having sensor conduits structured to fluidly connect to an exhaust conduit in an exhaust system and feed exhaust to a differential pressure sensor. The differential pressure sensor produces a pressure signal indicative of a pressure drop across an exhaust aftertreatment element such as an exhaust filter. A plugging-mitigation conduit provides an always-open leakage path to convey condensate in a stream of leaked exhaust between the sensor conduits to prevent formation of deposits that can impact pressure sensing accuracy.

18 Claims, 4 Drawing Sheets

EXHAUST SYSTEM HAVING PRESSURE SENSING SYSTEM WITH PLUGGING-MITIGATION CONDUIT FORMING ALWAYS-OPEN LEAKAGE PATH

TECHNICAL FIELD

The present disclosure relates generally to exhaust pressure sensing in an exhaust system for an internal combustion engine, and more particularly to preventing plugging of a sensor conduit with deposits affecting accuracy of exhaust pressure signals.

BACKGROUND

Monitoring, evaluation, and control of various aspects of exhaust system operation and state in internal combustion engine exhaust systems can be critical for optimized performance. In recent years, various jurisdictional requirements have been implemented that limit the relative amounts of certain exhaust constituents that can be discharged to the atmosphere. Of particular interest are emissions of oxides of nitrogen, or NOx, and particulates. Various monitoring systems and techniques have been proposed over the years to monitor factors such as temperature, absolute pressure, differential pressure, mass flow, and still other properties of engine exhaust for many different purposes.

In one example pressure sensing implementation a pressure drop across a particulate filter in an exhaust system is monitored to enable a controller to determine a relative state of filling of the particulate filter with particulates. Over the course of engine operation particulates, notably soot, are trapped in an exhaust filter to prevent discharge of those particulates to the atmosphere. As the particulate filter fills, however, the accumulated material can begin to limit the capacity for exhaust flow through the filter and produce back pressure that can interfere with engine operation if not ameliorated.

Various techniques have been proposed for regenerating particulate filters, generally either passively by promoting the oxidation of soot with catalysts resident on the particulate filter, or through various means for actively regenerating the particulate filter. So-called active regeneration can utilize manipulation of the engine operation to produce increased exhaust temperatures that assist in oxidizing the trapped particulates, delivery of fuel into the stream of exhaust to assist in regeneration, electrically powered resistance heaters, or still other techniques. Since active regeneration requires energy, and can alter the manner in which the engine is presently operated, there are typically efficiency penalties associated with regeneration. For this reason, various control systems and sensing strategies are known which attempt to determine with relative precision when regeneration is necessary, or otherwise when advantageous conditions for regeneration are present. In most active regeneration strategies, it is generally necessary to monitor exhaust pressures at one or more locations in the exhaust system. U.S. Pat. No. 8,968,443 to Brinkmeyer et al, sets forth an example closed loop pressure management system for an exhaust regeneration system. Brinkmeyer et al. has various applications, however, there is always room for improvement and development of alternative strategies.

SUMMARY OF THE INVENTION

In one aspect, an exhaust system includes an exhaust conduit extending between an upstream exhaust inlet and a downstream exhaust outlet. The exhaust system further includes an exhaust aftertreatment device positioned fluidly within the exhaust conduit and structured to treat exhaust conveyed from the upstream exhaust inlet to the downstream exhaust outlet. The exhaust system further includes an exhaust pressure sensor, and a sensor conduit fluidly connected to the exhaust conduit and extending to the exhaust pressure sensor to expose the exhaust pressure sensor to a fluid pressure of the exhaust. The exhaust system still further includes a plugging-mitigation conduit forming an always-open leakage path from the sensor conduit.

In another aspect, an exhaust pressure sensing system includes an upstream sensor conduit having a first inlet end structured to fluidly connect to an exhaust conduit at an upstream location, and a first sensing end opposite to the first inlet end. The exhaust pressure sensing system further includes a downstream sensor conduit having a second inlet end structured to fluidly connect to an exhaust conduit at a downstream location, and a second sensing end opposite to the second inlet end. The exhaust pressure sensing system further includes a differential pressure sensor having at least one sensing element exposed to a fluid pressure of the upstream sensor conduit and to a fluid pressure of the downstream sensor conduit at the respective first sensing end and second sensing end, and a plugging-mitigation conduit. The plugging-mitigation conduit is fluidly connected to the upstream sensor conduit and to the downstream sensor conduit, and includes a flow-restriction fluidly between the upstream sensor conduit and the downstream sensor conduit, and forms an always-open leakage path to convey condensate in a stream of leaked exhaust from the upstream sensor conduit to the downstream sensor conduit.

In still another aspect, a method of exhaust pressure sensing in an exhaust system includes fluidly connecting a sensor conduit to an exhaust conduit in the exhaust system, and fluidly connecting a plugging-mitigation conduit to the sensor conduit so as to form a leakage path from the sensor conduit. The method further includes feeding exhaust from the exhaust conduit into the sensor conduit such that a fluid pressure of the exhaust impinges upon an exhaust pressure sensor, and leaking exhaust out of the sensor conduit through the exhaust leakage path. The method further includes conveying condensate out of the sensor conduit with the leaked exhaust, returning the leaked exhaust and the conveyed condensate to the exhaust conduit, and producing an exhaust pressure signal with the exhaust pressure sensor based upon the fluid pressure of the exhaust.

DETAILED DESCRIPTION

Figure 1:
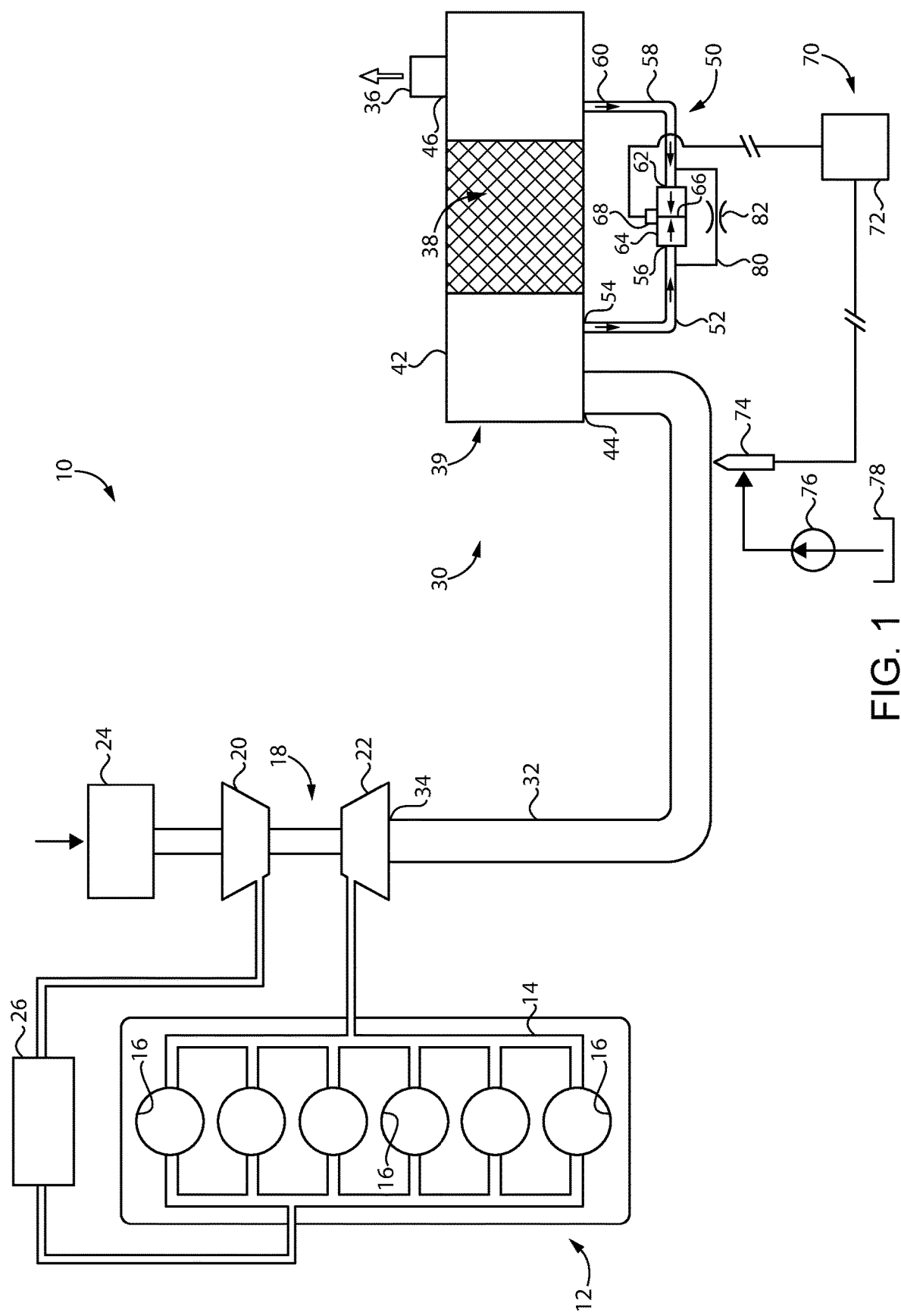
FIG. 1 is a diagrammatic view of an engine system, according to one embodiment.

Referring to FIG. 1, there is shown an internal combustion engine system 10 according to one embodiment and including an internal combustion engine 12 having an engine housing 14 with a plurality of cylinders 16 formed therein in a generally conventional manner. Internal combustion engine system 10 (hereinafter "engine system 10") may include a direct-injected compression-ignition diesel engine 12 structured to operate on a diesel distillate fuel, for example, however the present disclosure is not thereby limited. Cylinders 16 can include any number of cylinders in any suitable arrangement. Engine system 10 may also include a turbocharger 18 having a compressor 20 and a turbine 22. Air is fed by way of an air inlet 24 to compressor 20, through an aftercooler 26, and supplied to cylinders 16 for combustion with fuel therein.

Exhaust from cylinders 16 is fed through turbine 22 and into an exhaust system 30. Exhaust system 30 includes an exhaust conduit 32 extending between an upstream exhaust inlet 34 and a downstream exhaust outlet 36. An exhaust aftertreatment device 38 is positioned fluidly within exhaust conduit 32 and is structured to treat exhaust conveyed from upstream exhaust inlet 34 to downstream exhaust outlet 36. As used herein, the term upstream means a direction, in exhaust system 30, toward internal combustion engine 12, and downstream means an opposite direction. Exhaust aftertreatment device 38 may include a filter medium of an exhaust particulate filter assembly 39 having a housing 42. Housing 42 forms a segment of exhaust conduit 32 and is structured to convey exhaust from internal combustion engine 12 through exhaust aftertreatment device 38 so as to trap particulates such as soot and ash therein. Housing 42 may include a housing inlet 44 and a housing outlet 46 with exhaust aftertreatment device 38 positioned fluidly between housing inlet 44 and housing outlet 46. In many implementations, additional exhaust aftertreatment devices and components may be positioned between upstream exhaust inlet 34 and downstream exhaust outlet 36, such as a diesel oxidation catalyst or DOC, and a selective catalytic reduction or SCR device, a sulfate trap, or combinations of and alternatives to these.

Exhaust system 30 further includes an exhaust pressure sensing system 50 structured, for example, to monitor a pressure drop across device 38 for purposes of determining a tuning or suitability of regenerating device 38, monitoring or modifying operation of internal combustion engine 12, or for still other purposes, as further discussed herein. Exhaust system 30 further includes a regeneration control system 70 including an electronic control unit 72 coupled with a fuel injector 74. Fuel injector 74 may be supplied with a fuel, for example diesel distillate fuel, from a tank 78 by way of a pump 76. Electronic control unit 72 can include any suitable computerized device having a central processing unit, such as a microprocessor, a microcontroller, or still another. Regeneration control system 70 may be structured to controllably regenerate exhaust aftertreatment device 38 based upon one or more of an absolute exhaust pressure or a differential exhaust pressure, measured at one or more sensing locations, as further discussed herein.

Exhaust pressure sensing system 50 (hereinafter "sensing system 50") includes an upstream sensor conduit 52 having a first inlet end 54 structured to fluidly connect to exhaust conduit 32 at an upstream location, and a first sensing end 56 opposite to first inlet end 54. Sensing system 50 also includes a downstream sensor conduit 58 having a second inlet end 60 structured to fluidly connect to exhaust conduit 32 at a downstream location, and a second sensing end 62 opposite to second inlet end 60. Sensing system 50 also includes an exhaust pressure sensor 64, for example, a differential pressure sensor, including at least one sensing element 66 exposed to a fluid pressure of exhaust in a sensor conduit, including a fluid pressure of exhaust in upstream sensor conduit 52 and a fluid pressure of downstream sensor conduit 58 at the respective first sensing end 56 and second sensing end 62.

The at least one sensing element 66 may include a diaphragm exposed to the fluid pressure of upstream sensor conduit 52 and to the fluid pressure of downstream sensor conduit 58, and one or more strain gauges 68 operably, coupled to sensing element 66. The one or more strain gauges 68 may be electrically connected to electronic control unit 72, such that electronic control unit 72 can calculate, observe, infer, or otherwise determine a value indicative of an exhaust pressure in exhaust system 30. As noted above, the exhaust pressure can include a differential pressure and differential pressure sensor 64 can produce a differential exhaust pressure signal output to electronic control unit 72.

Those skilled in the art will appreciate that differential pressure can be calculated based upon absolute pressure signals from different pressure sensing locations employing, for example, multiple diaphragms, multiple strain gauges, or a variety of other sensing apparatus. The present disclosure should be understood to apply without limitation to sensing of exhaust pressure regardless of the specific sensor hardware configuration or system used. It should also be appreciated that while the present description emphasizes sensing a differential pressure, the teachings herein can be applied to sensing of absolute pressures, for purposes of determining filter regeneration timing, filter state, exhaust back pressure magnitude, or a variety of other pressure parameters potentially of interest in the operation and control of an internal combustion engine system. It should also be appreciated that other regeneration technologies, for instance, electrically powered heater active regeneration technologies, passive regeneration, or combinations of passive and active regeneration might be suitably applied in the present context and the example description of regeneration control system 70 is for illustrative purposes only.

It has been observed in certain exhaust pressure sensing systems that sensor mis-readings, calibration drift, inaccuracies, logging of fault codes, or pressure sensor failures can be observed where deposits accumulate in fluid conduit lines feeding exhaust gasses to a sensor. It is believed that in some instances production of condensation in sensor lines in the presence of raw engine exhaust can result in formation of deposits that can shield sensing elements from pressures or pressure changes, or otherwise interfere with proper pressure sensor operation. When an engine is started, for example, relatively hot exhaust gasses laden with water vapor can encounter relatively cool surfaces of equipment in the exhaust system, including sensor lines, that result in condensing of water from the exhaust. Over time, repeated production of condensate that mixes with other materials carried in the exhaust to form the solid deposits, can trigger fault codes in the associated control system, cause sensor readings to be inaccurate, or cause other problems. These challenges can sometimes be compounded by packaging constraints that can necessitate placement of sensor conduits in relatively horizontal orientations, which can promote pooling of condensate.

According to the present disclosure, providing a controlled, positive pressure of exhaust within and through a sensor conduit can limit or eliminate pooling of condensate that leads to the problems discussed above. To this end, sensing system 50 can include a plugging-mitigation conduit 80 fluidly connected to upstream sensor conduit 52 and to downstream sensor conduit 58, and having a flow restriction 82 fluidly between upstream sensor conduit 52 and downstream sensor conduit 58. Plugging-mitigation conduit 80 forms an always-open leakage path to convey condensate in a stream of leaked exhaust from upstream sensor conduit 52 to downstream sensor conduit 58. Always-open means the leakage path is not opened, closed, or restricted by a movable valve or the like, and instead provides a continuous unobstructed flow path.

In the embodiment of FIG. 1, flow restriction 82 includes an orifice plate as illustrated, where a reduced-size hole or port is interposed relatively larger flow passages positioned fluidly between upstream sensor conduit 52 and downstream sensor conduit 58. In other embodiments, further discussed herein, a size of plugging-mitigation conduit 80 itself may provide the desired flow restriction. It will be appreciated that the leakage path formed by plugging-mitigation conduit 80 can provide a relatively small, continuous stream of leaked exhaust that continuously flows between upstream sensor conduit 52 and downstream sensor conduit 58. In still other embodiments, an additional source of positive pressure could be provided to augment the fluid flow through plugging-mitigation conduit 80, for example, by way of connecting a supply line separate from upstream conduit 52 to another location in exhaust system 30, or a supply line from compressor 20, or still another arrangement.

Figure 2:
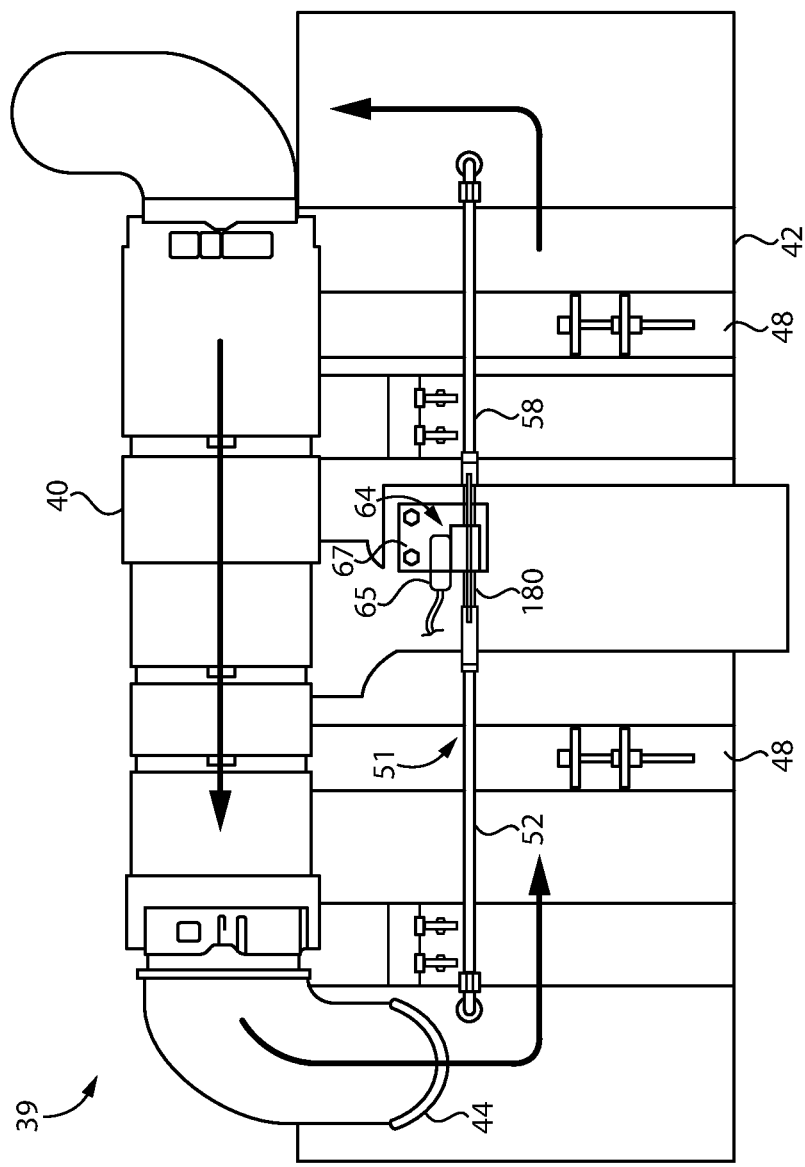
FIG. 2 is a diagrammatic view of a portion of the engine system of FIG. 1.
Figure 3:
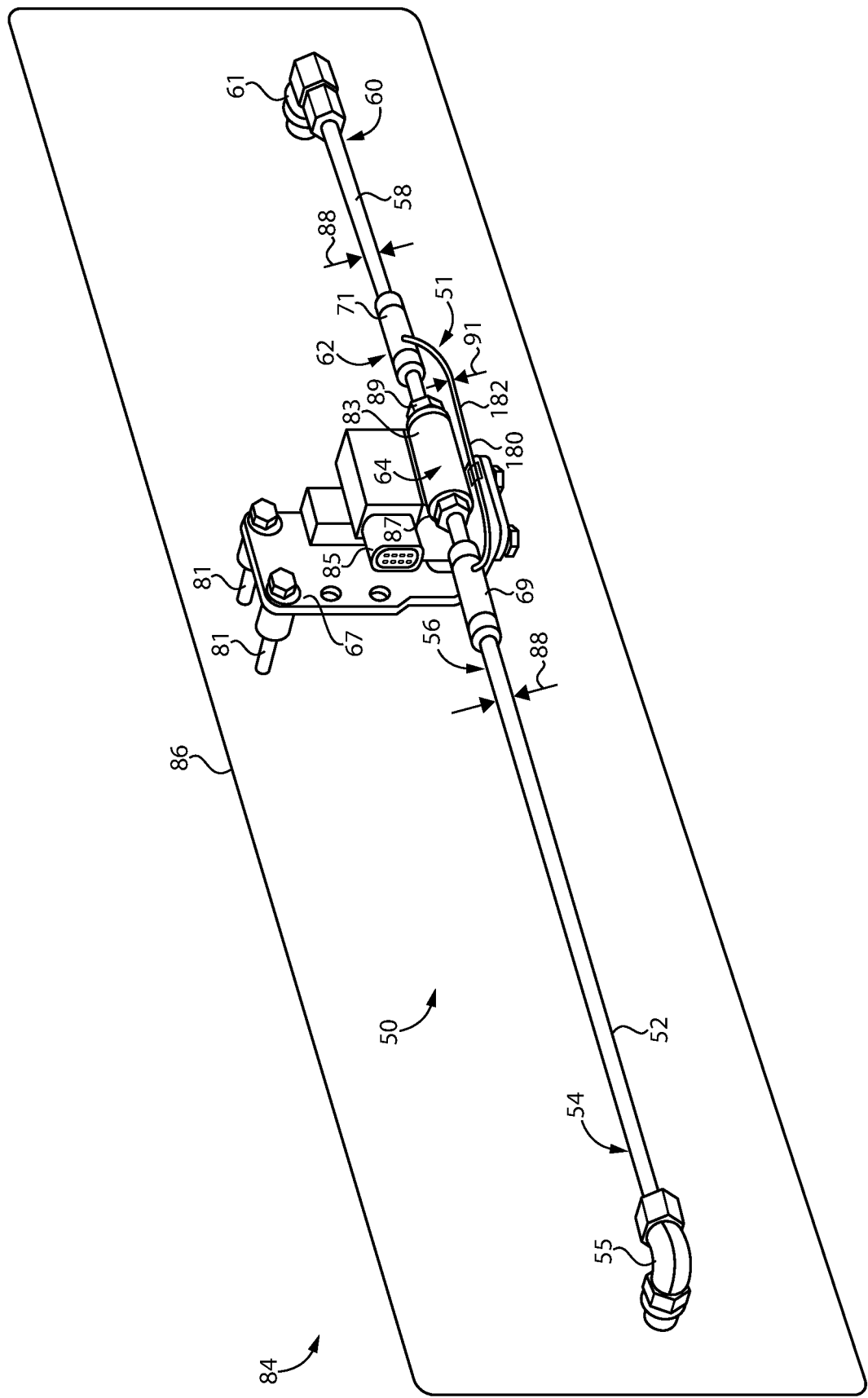
FIG. 3 is a diagrammatic view of a service package including an exhaust pressure sensing system, according to one embodiment.

Referring also now to FIG. 2 and FIG. 3, there are shown additional features of sensing system 50 including an example installation configuration in FIG. 2. Sensing system 50 may be embodied, at least in part, in a sensor assembly 51 that is mounted to housing 42 and arranged such that upstream sensor conduit 52 and downstream sensor conduit 58 are oriented substantially horizontally. In sensor assembly 51, a plugging-mitigation conduit 180 that provides a flow restriction by virtue of its size alone is also used. FIG. 2. depicts a general exhaust flow pattern through housing 42 from an upstream exhaust system component 40, that can include another aftertreatment device, or piping positioned to deliver exhaust into housing inlet 44, for example. As can also be seen from FIG. 3, sensing system 50 may be provided as a service package 84, with sensor assembly 51 assembled for service, or provided with the several components in a disassembled state in a container 86 such as a box, padded envelope, or the like.

As discussed above, upstream sensor conduit 52 includes a first inlet end 54, which may be equipped with a fitting 55, and a first sensing end 56 that is equipped with another fitting 69. Downstream sensor conduit 58 can include a second inlet end 60 which may be equipped with a fitting 61, and a second sensing end 62 equipped with a fitting 71. Pressure sensor 64 includes a sensor body 83 fluidly connected by way of a fitting 87 and a fitting 89 to first sensing end 56 and second sensing end 62. A sensing element and a strain gauge similar to those described above may be housed within or coupled with sensor body 83. An electrical connector is shown at 85 in FIG. 3, and may be structured to connect with an electrical plug 65 as depicted in FIG. 2. Sensor assembly 51 also includes a mounting bracket 67 having a plurality of fasteners 81 structured for attaching fastener assembly 51 to housing 42. It will also be recalled that plugging-mitigation conduit 180 includes a line size that provides the desired flow restriction. In FIG. 3, each of upstream sensor conduit 52 and downstream sensor conduit 58 has a larger line size shown at 88, and plugging-mitigation conduit 180 has a smaller line size shown at 91 that forms the flow restriction. A ratio of larger line size 88 to smaller line size 91 may be at least 5:1, and in some instances may be approximately 6:1. Line size refers to an outer diameter dimensional size, and it will be appreciated that inner diameter dimensional sizes forming internal flow areas of the various conduits will generally correspond to the outer diameter dimensional line size. In other words, internal flow areas, in cross-section, of upstream sensor conduit 52, downstream sensor conduit 58, and plugging-mitigation conduit 180 may have the aforementioned ratios in some embodiments. In some instances, it may be desirable to connect plugging-mitigation conduit 180 as close to sensor body 83 as practicable, and in the illustrated case plugging-mitigation conduit 180 fluidly connects to upstream sensor conduit 52 at a first connection location that is closer to first sensing end 56 than to first inlet end 54, and fluidly connects to downstream sensor conduit 58 at a second connection location that is closer to second sensing end 62 that to second inlet end 60.

INDUSTRIAL APPLICABILITY

Exhaust pressure sensing in an exhaust system according to the present disclosure includes fluidly connecting a sensor conduit, including for example upstream sensor conduit 52, to an exhaust conduit in the exhaust system. Exhaust pressure sensing also includes fluidly connecting a plugging-mitigation conduit as described herein to the sensor conduit so as to form a leakage path from the sensor conduit. When the exhaust system is operated, exhaust will be fed from the exhaust conduit into the sensor conduit such that fluid pressure of the exhaust impinges upon an exhaust pressure sensor. The feeding of exhaust in this manner will result in leaking of exhaust out of the sensor conduit through the exhaust leakage path. Condensate, including water and other materials condensed from raw exhaust, will have a tendency to be conveyed out of the sensor conduit along with the leaked exhaust. As also discussed herein, in some embodiments the leaked exhaust and the conveyed condensate is returned to the exhaust conduit. Exhaust pressure sensor 64 can be operated to produce an exhaust pressure signal based upon the fluid pressure of the exhaust impinging upon sensing element 66. As discussed herein, the present disclosure is contemplated to be applicable to absolute pressure sensors as well as differential pressure sensors.

Figure 4:
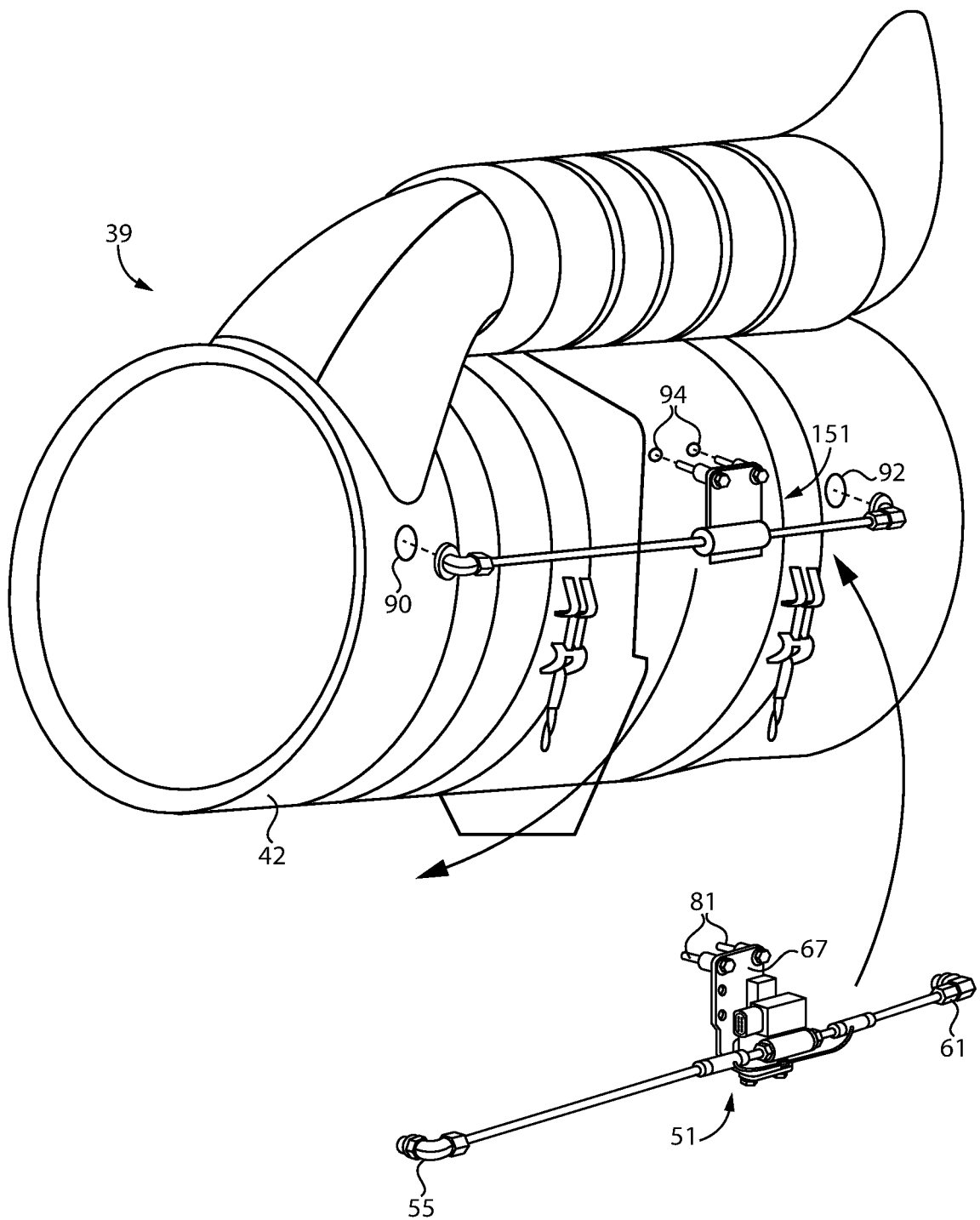
FIG. 4 is a diagrammatic view of swapping a replacement exhaust pressure sensing system for a used exhaust pressure sensing system in an exhaust system, according to one embodiment.

Referring now also to FIG. 4, there it can be seen that sensor assembly 51 is assembled for service and positioned to be swapped for a used sensor assembly 151. It can also be noted that used sensor assembly 151, including one or more used sensor conduits and a used exhaust pressure sensor, has been decoupled from housing 42. A first port 90 and a second port 92 are formed in housing 42 and structured to mate with fitting 55 and fitting 61, respectively. Fastener openings 94 are also formed in housing 42 and structured to receive fasteners 81 attached to bracket 67 of sensor assembly 5. In this general manner, a used sensor assembly can be swapped out at a scheduled service interval, or at another time, for new sensor assembly 51 with sensor assembly 51 having the suitable dimensions, fittings, and configuration to serve as a drop-in replacement system. It will be appreciated that in other instances, a lesser number of parts could be provided in a service package including, for example, only suitable fittings and a plugging-mitigation conduit, such as fittings 69 and 71 and plugging-mitigation conduit 180 as shown in FIG. 3, and installed for service with an existing upstream sensor conduit, downstream sensor conduit, exhaust pressure sensor, and mounting hardware.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed:

1. An exhaust system comprising:
   an exhaust conduit extending between an upstream exhaust inlet and a downstream exhaust outlet;
   an exhaust aftertreatment device positioned fluidly within the exhaust conduit and structured to treat exhaust conveyed from the upstream exhaust inlet to the downstream exhaust outlet;
   an exhaust pressure sensor;
   a sensor conduit including an inlet end fluidly connected to the exhaust conduit at an exhaust feed location that is fluidly between the upstream exhaust inlet and the exhaust aftertreatment device, and a sensing end, and the sensor conduit extending to the exhaust pressure sensor to expose the exhaust pressure sensor to a fluid pressure of the exhaust; and
   a plugging-mitigation conduit fluidly connected to the sensor conduit at an exhaust leakage location that is fluidly between the inlet end and the sensing end and forming an always-open leakage path from the sensor conduit.

2. The exhaust system of claim 1 wherein the sensor conduit is fluidly connected to the exhaust conduit at a location upstream of the exhaust aftertreatment device.

3. The exhaust system of claim 2 wherein the exhaust aftertreatment device includes a filter medium in a particulate filter assembly.

4. The exhaust system of claim 2 wherein the always-open leakage path connects to the exhaust conduit at a location downstream of the exhaust aftertreatment device.

5. The exhaust system of claim 4 wherein the exhaust pressure sensor includes a differential pressure sensor, and further comprising a downstream sensor conduit fluidly connected to the exhaust conduit at a location downstream of the exhaust aftertreatment device and extending to the pressure sensor.

6. The exhaust system of claim 5 wherein the plugging-mitigation conduit is fluidly connected to the downstream sensor conduit.

7. An exhaust pressure sensing system comprising:
   an upstream sensor conduit including a first inlet end structured to fluidly connect to an exhaust conduit at an upstream location, and a first sensing end opposite to the first inlet end;
   a downstream sensor conduit including a second inlet end structured to fluidly connect to the exhaust conduit at a downstream location, and a second sensing end opposite to the second inlet end;
   a differential pressure sensor including at least one sensing element exposed to a fluid pressure of the upstream sensor conduit and to a fluid pressure of the downstream sensor conduit at the respective first sensing end and second sensing end, and the differential pressure sensor being configured to produce a pressure signal indicative of a pressure difference between an exhaust pressure of the upstream sensor conduit at the first inlet end and an exhaust pressure of the downstream sensor conduit at the second inlet end; and
   a plugging-mitigation conduit fluidly connected to the upstream sensor conduit and to the downstream sensor conduit, the plugging-mitigation conduit including a flow restriction fluidly between the upstream sensor conduit and the downstream sensor conduit, and forming an always-open leakage path to convey condensate in a stream of leaked exhaust from the upstream sensor conduit to the downstream sensor conduit.

8. The system of claim 7 wherein the at least one sensing element includes a diaphragm exposed to the fluid pressure of the upstream sensor conduit and to the fluid pressure of the downstream sensor conduit, and a strain gauge operably coupled to the diaphragm.

9. The system of claim 8 further comprising a service package containing the upstream sensor conduit, the downstream sensor conduit, the differential pressure sensor, and the plugging-mitigation conduit.

10. The system of claim 7 wherein the plugging-mitigation conduit fluidly connects to the upstream sensor conduit at a first connection location that is closer to the first sensing end than to the first inlet end, and fluidly connects to the downstream sensor conduit at a second connection location that is closer to the second sensing end than to the second inlet end.

11. The system of claim 10 wherein each of the upstream sensor conduit and the downstream sensor conduit has a larger line size, and the plugging-mitigation conduit has a smaller line size that forms the flow restriction.

12. The system of claim 11 wherein a ratio of the larger line size to the smaller line size is at least 5:1.

13. The system of claim 10 wherein the plugging-mitigation conduit includes an orifice plate that forms the flow restriction.

14. A method of exhaust pressure sensing in an exhaust system comprising:
   fluidly connecting a sensor conduit to an exhaust conduit in the exhaust system;
   fluidly connecting a plugging-mitigation conduit to the sensor conduit so as to form a leakage path from the sensor conduit;
   feeding exhaust from the exhaust conduit into the sensor conduit from a first location of the exhaust conduit that is upstream of an exhaust aftertreatment device, such that a fluid pressure of the exhaust fed into the sensor conduit from the first location impinges upon an exhaust pressure sensor;
   feeding exhaust from the exhaust conduit into the sensor conduit from a second location of the exhaust conduit that is downstream of the exhaust aftertreatment device, such that a fluid pressure of the exhaust fed into the sensor conduit from the second location impinges upon the exhaust pressure sensor;
   leaking exhaust out of the sensor conduit through the exhaust leakage path;
   conveying condensate out of the sensor conduit with the leaked exhaust;
   returning the leaked exhaust and the conveyed condensate to the exhaust conduit; and
   producing an exhaust pressure signal with the exhaust pressure sensor.

15. The method of claim 14 wherein
   the producing of an exhaust pressure signal further includes producing an exhaust pressure signal that is indicative of an exhaust pressure drop across the exhaust aftertreatment device.

16. The method of claim 14 further comprising fluidly connecting the plugging-mitigation conduit to the exhaust conduit at a location that is downstream of the exhaust aftertreatment device.

17. The method of claim 16 wherein the fluidly connecting of the plugging-mitigation conduit includes fluidly connecting the plugging-mitigation conduit to a downstream sensor conduit.

18. The method of claim 14 further comprising swapping an assembly including the sensor conduit, the exhaust pressure sensor, and the plugging-mitigation conduit for an assembly of a used sensor conduit and a used exhaust pressure sensor, in the exhaust system.

\* \* \* \* \*